United States Patent
Houchin et al.

(10) Patent No.: US 6,321,192 B1
(45) Date of Patent: Nov. 20, 2001

(54) ADAPTIVE LEARNING METHOD AND SYSTEM THAT MATCHES KEYWORDS USING A PARSED KEYWORD DATA STRUCTURE HAVING A HASH INDEX BASED ON AN UNICODE VALUE

(75) Inventors: Alice Maria Houchin; Douglas Andrew Wood, both of Indianapolis, IN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/177,033

(22) Filed: Oct. 22, 1998

(51) Int. Cl.[7] .............................. G06F 17/27; G06F 17/30
(52) U.S. Cl. ............................ 704/9; 704/1; 707/5; 707/6
(58) Field of Search .................................. 704/1, 8, 9, 10; 707/531, 532, 533, 535, 536, 1, 2, 3, 4, 5, 6, 100, 104.1

(56) References Cited

U.S. PATENT DOCUMENTS

| | | | |
|---|---|---|---|
| 3,601,808 | 8/1971 | Vleck | 711/4 |
| 4,972,349 | 11/1990 | Kleinberger | 707/1 |
| 5,062,074 | 10/1991 | Kleinberger | 707/5 |
| 5,285,411 | 2/1994 | McAulay | 365/49 |
| 5,297,039 | 3/1994 | Kanaegami et al. | 707/5 |
| 5,428,778 * | 6/1995 | Brookes | 707/5 |
| 5,497,488 | 3/1996 | Akizawa et al. | 707/6 |
| 5,568,639 * | 10/1996 | Wilcox et al. | 707/200 |
| 5,664,189 * | 9/1997 | Wilcox et al. | 707/205 |
| 5,704,060 | 12/1997 | Del Monte | 707/104 |
| 5,715,446 * | 2/1998 | Kinoshita et al. | 707/5 |
| 5,724,593 * | 3/1998 | Hargrave, III et al. | 704/7 |
| 5,761,655 | 6/1998 | Hoffman | 707/4 |
| 5,764,974 | 6/1998 | Walster et al. | 707/6 |
| 5,870,084 * | 2/1999 | Kanungo et al. | 345/192 |
| 6,014,733 * | 1/2000 | Bennett | 711/216 |

FOREIGN PATENT DOCUMENTS

| | | | |
|---|---|---|---|
| 0 800 158 | * | 8/1997 | (EP) . |
| 2288258 | * | 11/1990 | (JP) . |
| 9204439 | * | 8/1997 | (JP) . |
| 09259146 | * | 10/1997 | (JP) . |
| 09269952 | * | 10/1997 | (JP) . |
| 09305462 | * | 11/1997 | (JP) . |
| 09305626 | * | 11/1997 | (JP) . |
| 1091493 | * | 4/1998 | (JP) . |

OTHER PUBLICATIONS

IBM Technical Disclosure Bulletin (04/94), vol. 37, No. 04B, *Sort of Search Results of Information Retrieval System*, pp. 431–432.*

IBM Technical Disclosure Bulletin, vol. 41, No. 01, Jan. 1998, *Intelligent Searching of Dynamic Databases*, pp. 647–650.*

IBM Technical Disclosure Bulletin, vol. 40, No. 10, Oct. 1997, *Method of Keyword Categorization*, pp. 51–52.*

* cited by examiner

Primary Examiner—Joseph Thomas
(74) Attorney, Agent, or Firm—Duke W. Yee; Jeffrey S. LaBaw; Charles D. Stepps, Jr.

(57) ABSTRACT

An adaptive learning system and method. This method begins when a problem description provided by the user is received. This problem description may include non-tokenized text. The description is then searched character-by-character against a unique keyword data structure for any user-defined keywords. During this matching process, the routine examines each character in the description and compares it to the keywords in the data structure. Once all keywords are identified, the routine generates a set of solutions associated with at least one of the matching keywords. These solutions are then ranked, for example, based on how many times a respective solution has been used (to solve the problem previously) or how may matching keywords are associated with a respective solution.

19 Claims, 4 Drawing Sheets

| KEYWORD | ID | OBJECTS | ID | USAGE COUNT | MASK | SCIM |
|---------|----|---------|----|-------------|------|------|
| | | | | | | |
| | | | | | | |
| | | ⋮ | | | | |
| | | | | | | |

ADAPTIVE LEARNING METHOD AND SYSTEM THAT MATCHES KEYWORDS USING A PARSED KEYWORD DATA STRUCTURE HAVING A HASH INDEX BASED ON AN UNICODE VALUE

BACKGROUND OF THE INVENTION

1. Technical Field

The present invention relates to data processing systems and, more particularly, to techniques for searching text strings for matches against a database of keywords to facilitate a search and retrieval mechanism.

2. Description of the Related Art

It is known in the art to provide computer-assisted diagnostic tools to assist end users in identifying and solving computer problems. Adaptive Learning (ADL) is one such diagnostic tool that provides a natural language interface for searching a database comprising active solutions to particular user problems. ADL has been implemented in known commercial products, such as the Tivoli Service Desk Version 5.0 Expert Advisor. ADL accepts unstructured textual descriptions and searches the descriptions for user-defined keywords. Each keyword is associated with a concept, and several keywords may be associated with a single concept. Thus, for example, the keywords crash, lock and freeze may have the single concept crash representing them. ADL uses the keywords and concepts to search a knowledge base for solutions related to a user's problem description. The solutions are then listed with a score indicating their relationship to a current problem.

In earlier ADL versions, these natural language descriptions were broken down into discrete words based on space delimitation. Each word was then compared for matches to a list of user-defined keywords. This ADL algorithm was not sufficient for use in an International application for several reasons. First, because many non-English languages do not use space delimitation in their writing systems, it was not possible to break down the natural language description into discrete words. Moreover, the techniques used in such prior versions for matching text against user-defined keywords did not operate against a full range of non-English characters.

There remains a need to provide new and improved adaptive learning methods and systems that address these and other deficiencies of the prior art.

BRIEF SUMMARY OF THE INVENTION

It is a general object of the present invention to provide an adaptive learning system for searching and retrieving solutions to user problems.

It is another object of this invention to provide an internationalized search mechanism for matching keywords in a user problem description to valid keywords stored in a dictionary table indexed by Unicode characters.

It is a further object of the present invention to efficiently compare a small, free-form problem description with a large number of keywords to determine whether any of the keywords exist in the short text string.

It is still another important object of the invention to take a non-tokenized text string (namely, a string that does not include spacing between words) and to analyze the string against keywords organized in a data structure, preferably a structure indexed by Unicode characters.

A more general object of this invention is to provide search and retrieval of previously recorded solutions to user problems. This information is used when new problem descriptions are entered. The description of the problem is analyzed for isolated keywords that appeared in previous solutions. The solutions that have the most keywords in common with the description are then returned as potential solutions to the new problem.

It is still another object of this invention to provide a methodology for ranking a set of problem solutions identified using the above-described search and retrieval strategy.

Still another object of this invention it to provide a very fast and efficient internationalized pattern matching algorithm for an adaptive learning diagnostic tool.

A more specific object of this invention is to provide an optimal solution to searching non-tokenized text for matches.

These and other objects of the invention are provided in an adaptive learning system and method. This method begins when a problem description provided by the user is received. This problem description may include non-tokenized text. The description is then searched character-by-character against a unique keyword data structure for any user-defined keywords. During this matching process, the routine examines each character in the description and compares it to the keywords in the data structure. Once all keywords are identified, the routine generates a set of solutions associated with at least one of the matching keywords. These solutions are then ranked, for example, based on how many times a respective solution has been used (to solve the problem previously) or how may matching keywords are associated with a respective solution.

In a preferred embodiment, the matching process searches a non-tokenized text string for matches against a keyword data structure organized as a set of one or more keyword objects. The routine begins by (a) indexing into the keyword data structure using a character in the non-tokenized text string. Preferably, the character is a Unicode value. The routine then continues by (b) comparing a portion of the non-tokenized text string to a keyword object. If the portion of the non-tokenized text string matches the keyword object, the routine saves the keyword object in a match list. If, however, the portion of the non-tokenized text string does not match the keyword object and there are no other keyword objects that share a root with the non-matched keyword object, the routine repeats step (a) with a new character. These steps are then repeated until all characters in the non-tokenized text string have been analyzed against the keyword data structure.

If the portion of the non-tokenized text string matches the keyword object and there is a second keyword object whose root is the keyword object matched, the method removes those characters from the non-tokenized text string corresponding to the keyword object matched and then repeats the comparison step with the second keyword object. The match list is then updated with the second keyword object if the portion of the non-tokenized text string matches the second keyword object.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
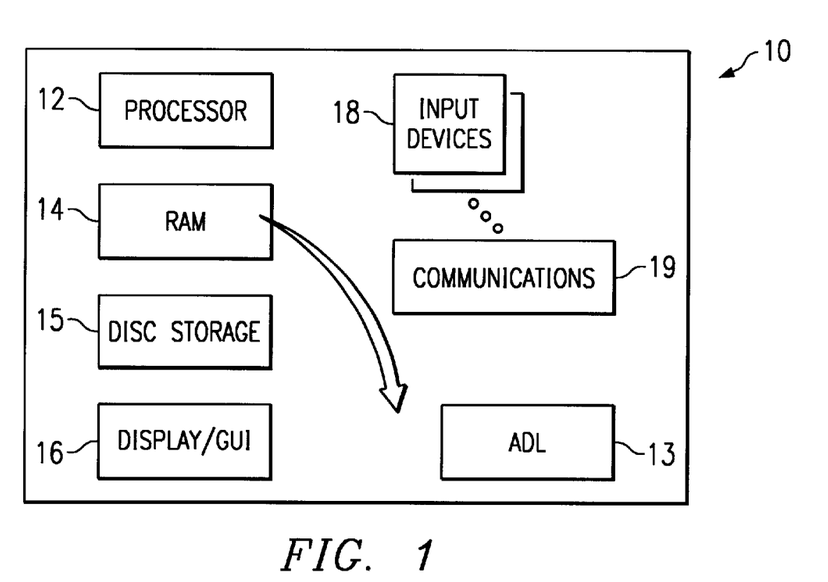
FIG. 1 is a block diagram of a computer that may be used to implement the adaptive learning functionality of the present invention.

As will be described below, one or more of the processes that comprise the present invention may be carried out on a computer or on several computers connected via a computer network. Referring to FIG. 1, a representative computer on which the inventive operation is to be performed is illustrated. The computer 10 has a processor 12 (e.g., Intel-, PowerPC®- or RISC®-based), random access or other volatile memory 14, disc storage 15, a display 16 having a suitable display interface, input devices (mouse, keyboard, and the like) 18, and appropriate communications devices 19 for interfacing the computer to a computer network.

Random access memory 14 supports a computer program 13 that provides the adaptive learning functionality of the present invention. The operating system preferably is a single-process operating environment running multiple threads at a single privilege level. The host system is a conventional computer having a processor and running an operating system such as IBM OS/2®, IBM AIX®, Windows NT, Windows '95 or UNIX. The host system supports a graphical user interface (GUI).

The present invention facilitates search and retrieval of previously-recorded solutions to problems identified by computer users. Thus, for example, the inventive scheme may be implemented in a telephone call center wherein call center analysts man workstations that receive telephone inquiries. This is commonly referred to as a "help" desk. The previously-stored information is used when new problem descriptions are encountered. In particular, according to the basic scheme, the description of the problem is analyzed for isolated keywords that have appeared in previous solutions. The solutions that have the most keywords in common with the user-entered problem description are then returned, for example, to the call center analyst. These solutions comprise potential solutions to the new problem and may be used by the analyst to facilitate finding a solution to the new problem. When that solution is found, it is then indexed into the knowledge base, together with the original user-entered problem description.

According to a feature of this invention, this known methodology is adapted to Internationalized problem descriptions. As used herein, an Internationalized problem is one that may (but need not) include non-tokenized tokenized text and/or one or more non-English language characters. A non-tokenized text string is a string that is not split into individual words. Prior to the present invention, adaptive learning strategies processed problem descriptions made up of individual words. In many countries, problem descriptions are not easily processed, in part, because some non-English languages do not separate words with spaces. According to the present invention, a search and retrieval strategy is implemented with respect to non-tokenized text and also with respect to so-called Unicode values, preferably values as defined in the Unicode Standard Version 2.1, which is incorporated herein by reference.

As is well-known, the Unicode Standard is a fixed-width, uniform encoding scheme designed to support the interchange, processing, and display of the written texts of the diverse languages of the modern world. The Unicode character encoding treats alphabetic characters, ideographic characters, and symbols identically. The Unicode Standard is modeled on the ASCII character set, but uses a 16-bit encoding to support full multilingual text. In addition, the Unicode Standard also includes punctuation marks, diacritics, mathematical symbols, technical symbols, arrows, dingbats, etc. In all, the Unicode Standard provides codes for nearly 39,000 characters from the world's alphabets, ideograph sets, and symbol collections.

Figure 2:
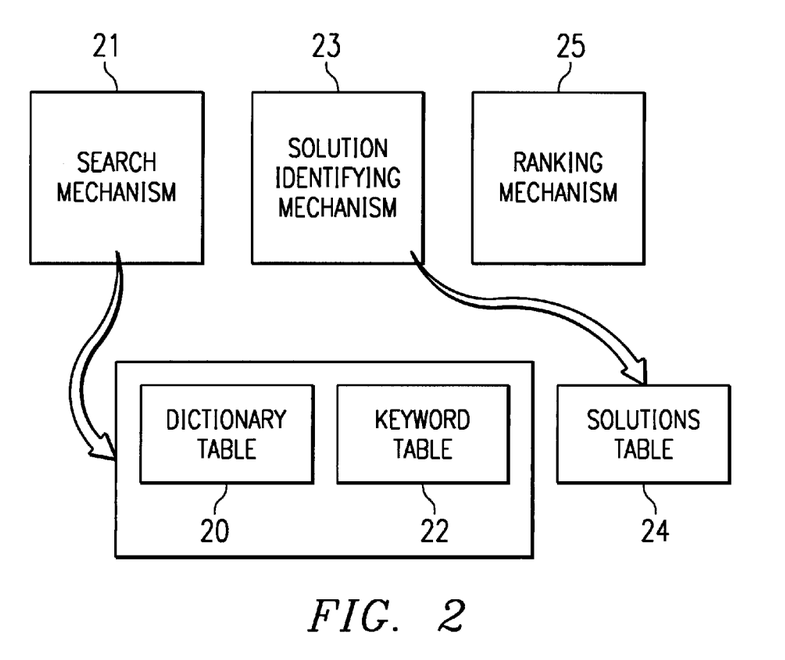
FIG. 2 is a block diagram of the preferred adaptive learning function modules used in the present invention.

By way of brief background, and with reference now to FIG. 2, the adaptive learning (ADL) functionality (computer program 13) is implemented conveniently as a dynamic linked library (DLL) or shared library. Applications thus may load ADL by calling the executable file. Preferably, ADL is a separate business object that applications may use as needed. The ADL function includes a search mechanism 21 for matching keywords in a user problem description to valid keywords, a solution identifying mechanism 23 for determining a set of solutions associated with at least one of the matching keyword, and a ranking mechanism 25 for ranking the set of solutions against some criteria.

When ADL is executed, the function is first initialized, for example, by allocating memory space for data structures and then either populating these structures from a database or a cached file, or setting them to null for later use. One or more tables are then populated during the initialization process. These include: a dictionary table 20 for use by a matching algorithm to locate keyword identifiers (IDs), a keyword table 22 that identifies each keyword, its ID and other identifying information including a usage count, and a solution count table 24. The dictionary and keyword tables are used by the search mechanism 21, while the solutions table 24 is used by the solution identifying mechanism 23. The solution table 24 contains all the solutions with their total usage count, namely, the total number of times a given solution has been previously used to address a user problem. This table may be read from the database or a cached file depending on the application architecture.

As will be seen below, the dictionary table 20 preferably is similar to a true data structure and holds valid keywords within the adaptive learning system. This structure is organized such that redundant comparisons are minimized, and it is preferably constructed as keyword information is read from a database, although any convenient mechanism may be used to build the structure and to populate the data. In one illustrative technique, ADL allocates space for the index and then, using SQL calls to the database for example, populates the table with this data. The dictionary table 20 is used to store this information in easily accessible memory rather than slowing ADL down further by making continual calls to the database. If desired, the dictionary table may be cached.

Figure 3:
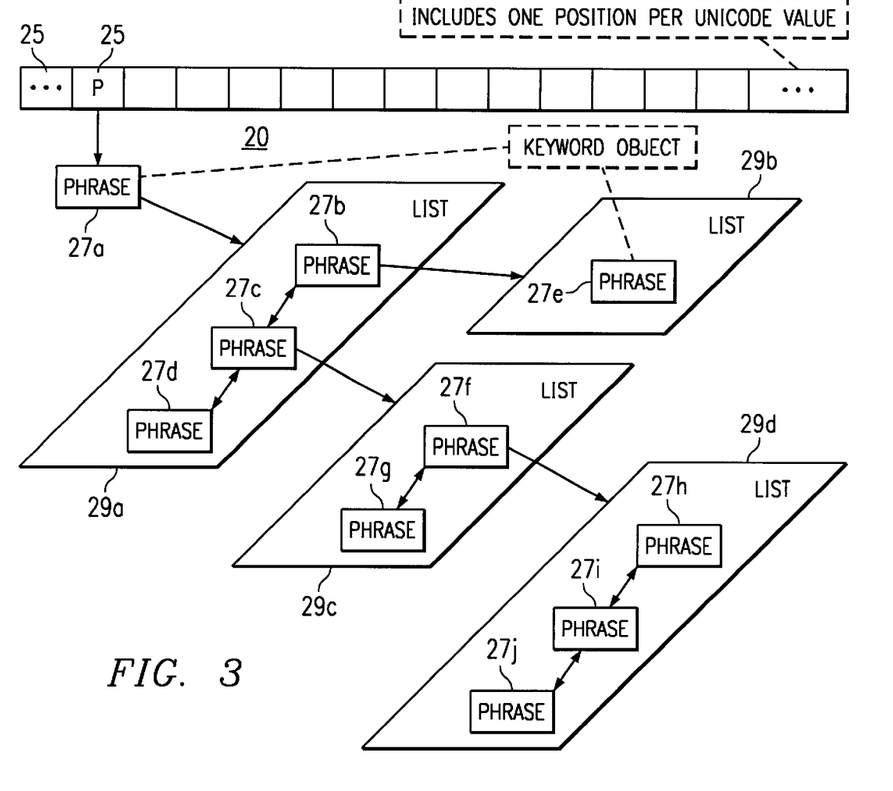
FIG. 3 is a block diagram illustrating a preferred structure of the dictionary table used in the search and retrieval mechanism of the present invention.

Referring now to FIG. 3, a representation of the preferred dictionary table structure 20 is provided. The table 20 includes a series of hash containers 25, with each container or position per Unicode value. Thus, the table 20 may be used as a hash table with a hash index based on the Unicode value of a given character of the problem description. Each hash container 25 usually has associated therewith a tree of "terms" or so-called keyword objects, in this example, 27a–j, each of which represent unique portions of a keyword. The first object is the initial keyword object 27a and, in this example, the remaining keyword objects are organized as a set of ordered lists 29a–d. In particular, list 29a is at a first or "top" level of the container tree and comprises keyword objects 27b–d, list 29b is at a second level and comprises keyword object 27e, list 29c is also at the second level and comprises keyword objects 27f–g, and list 29d is at a third level and comprises keyword objects 27h–j. Of course, this example (with three list levels) is merely exemplary. As can be seen, when two keywords share a root, the common portion is pulled out as a unique term, and the mismatched portions are terms hanging from that term. Thus, in FIG. 3, for example, the keyword object 27c represents the common portion of a set of keywords comprising objects 27f–g and 27h–j. Likewise, keyword object 27f represents the common portion or root of a set of keywords comprising objects 27h–j. In the preferred embodiment, a list (at a particular level) is any ordered sequence. As will be seen below, in the preferred embodiment, the ordering of keyword objects in a given list is alphabetical. Any type of container structure (e.g., an array, a table, a queue or the like) that provides an ordered structure of keyword objects may be used in lieu of a list.

Each container 25 in the table 20 preferably is a pointer to at least one individual keyword object. This is desirable because in certain languages a single character may stand for a single word. Thus, the dictionary table 20 may contain just one keyword object (in this case, object 27a) because a single character represented by the hash container may represent a keyword itself. The table may contain no keywords if there are no keywords beginning with a particular character. In the case where a single Unicode character stands for a single word, there is no need for a list at this level because there is no other character in the phrase. Thus, each hash container may have associated therewith an entire tree of keyword objects, a single keyword object or no keyword object (when the character does not contribute to any keyword).

Preferably, each keyword object has the ID of the keyword it completes (which is −1 if the object does not complete a keyword) and a list of further objects. Additionally, each object preferably has a flag for must__start__word and must__end__word. These flags are used to allow the user to configure how the keyword is matched. If must__start__word is selected, for example, the keyword and its associated solutions are returned only if this keyword appears in the description with a leading space. The must__end__word flag indicates that the keywords solutions are returned only if this object is followed in the description by a space.

Thus, the dictionary table comprises a parsed keyword list, with the hash index based on a Unicode value. A keyword may consist of any single character represented in the Unicode character set or any combination thereof including a "space" character. Thus, a single keyword may consist of multiple word phrases.

Figure 4:
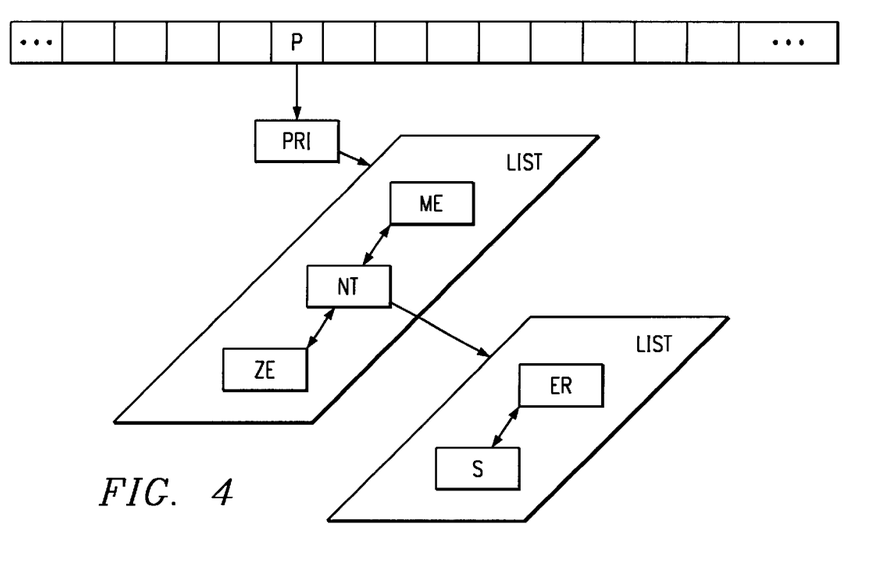
FIG. 4 is a block diagram of a particular instantiation of a portion of the dictionary table illustrating the data structure.

With reference to FIG. 4, for example, when two keywords share a root, such as PRINT and PRIME, the common portion (PRI) is pulled out as the unique term, and the two mismatched portions are terms in the list attached to that term. As can be seen, this ADL tree includes two levels below the initial PRI keyword object. The first level includes a list of the PRIME, PRINT and PRIZE keyword objects, and the second level comprises a list of the PRINTER and PRINTS keyword objects.

Figure 5:
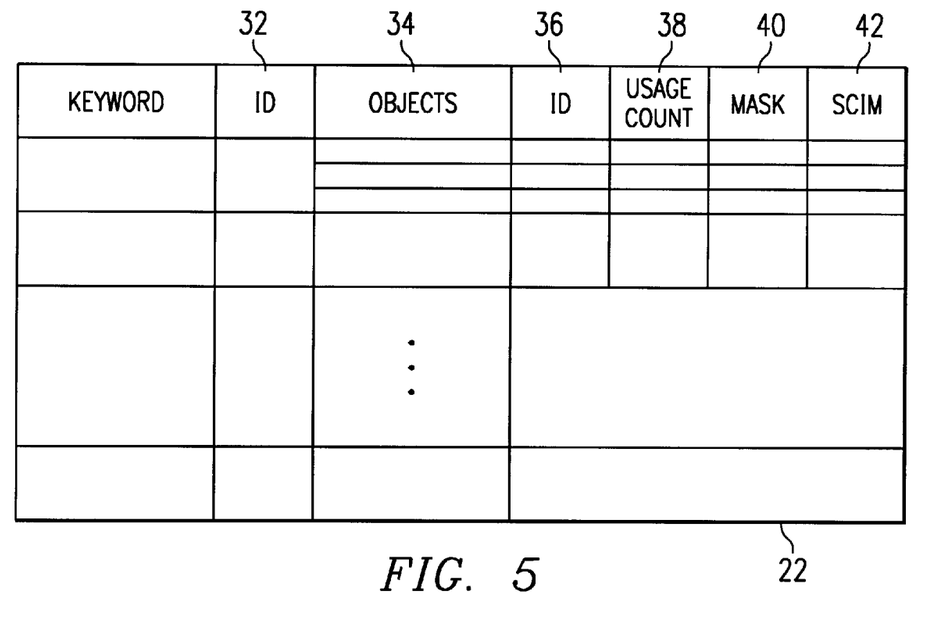
FIG. 5 is a block diagram of a keyword solution hash table used in the present invention.

Referring now briefly to FIG. 5, the keyword solution hash table 22 stores keywords. Each keyword contains a keyword ID 32, and a list 34 of solution objects. Each solution object, in turn, stores its solution ID 36, a usage count 38, a security mask 40, and a SCIM 42. The security mask 40 indicates the user rights, if any, to the solution. If a user has any of these rights, he or she may view the solution. ADL returns only the subset the user has the right to see. The SCIM 42 (System, Component, Item, Module) is a categorization mechanism for solutions. If a solution has SCIM information, and a SCIM is used in the call to produce similar solutions, the solution will only be returned if it has a matching SCIM. Thus, the keyword solution hash table 22 contains the solution associations with their usage count and SCIM information, if any. The table can be loaded from either a database or a cached file.

Figure 6:
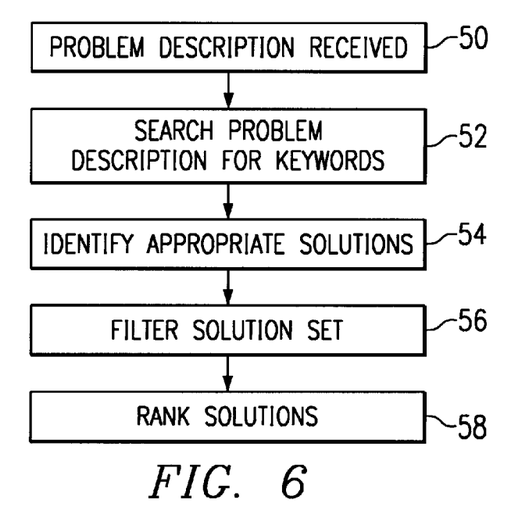
FIG. 6 is a flowchart illustrating the basic process steps of the adaptive learning mechanism of this invention.

FIG. 6 illustrates a flowchart of the basic ADL search and solution retrieval functionality. The routine begins at step 50 when a problem description provided by the user is received. At step 52, this description is searched character-by-character for any user-defined keywords. During this step, as will be described in more detail below, ADL examines each character in the description and compares it to the keywords in the dictionary table 20. At step 54, and once all keywords are identified, ADL identifies the appropriate solutions to return by looking through the keyword solution hash table 22. In particular, step 54 generates a set of solutions associated with at least one of the matching keywords. At step 56, the routine (optionally) filters those solutions for SCIM and for security. At step 58, ADL ranks the set of solutions, for example, based on how many times the respective solutions have been used (i.e. based on the usage count) and, optionally, based on how may matching keywords are associated with the respective solution.

Thus, once the ADL program has gathered the keywords, it searches for solutions relevant to the description. ADL, for each matching keyword, looks in the keyword solution hash table 22 at the associated solutions for this keyword. If ADL is set up to check SCIM matching as well, and the user has provided the information with this search, then ADL checks that the user SCIM information matches the solution's SCIM. ADL next scores each solution based on the number of associated keywords, the keyword usage count, and the solution's total usage count.

Figure 7:
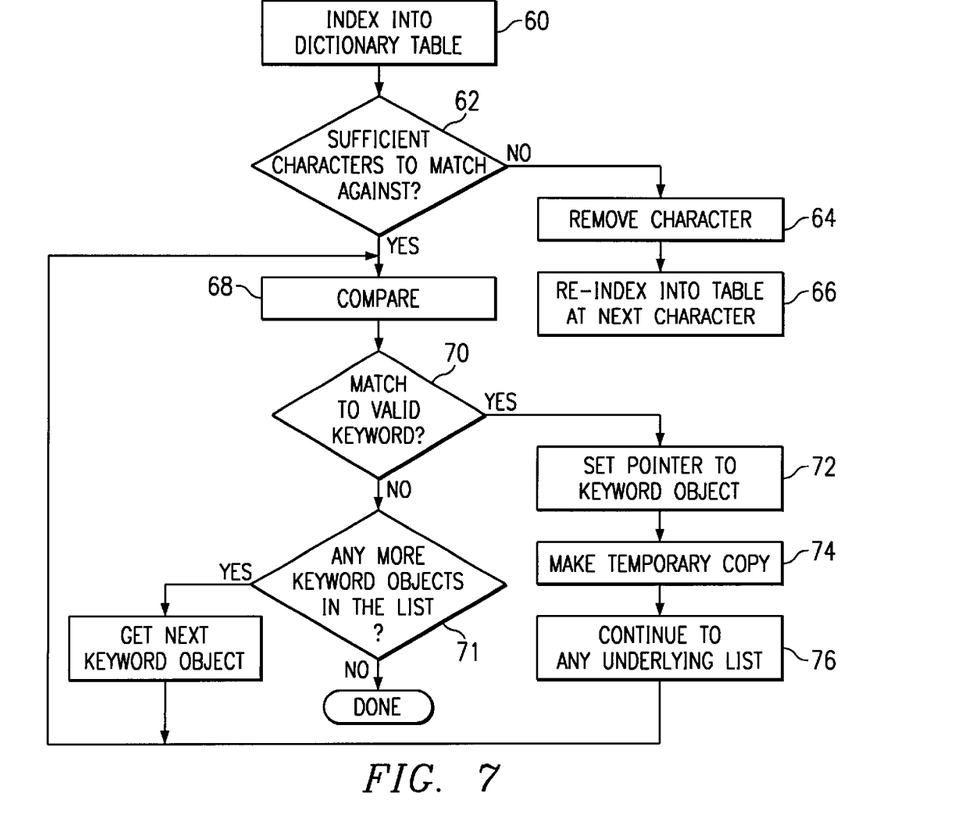
FIG. 7 is a detailed flowchart illustrating a preferred operation of the matching algorithm.

FIG. 7 is a detailed flowchart illustrating the preferred text description matching algorithm of the present invention. According to the preferred embodiment, the problem description is examined one character at a time, building to entire words while checking for keyword matches in the dictionary table 20. The matching algorithm operates against tokenized or non-tokenized text. As described above, the dictionary table 20 is organized so that there is just one tree corresponding to the keywords that begin with a given Unicode character. The problem description string is then applied to the keywords on a character-by-character basis in the following manner.

At step 60, the routine indexes into the dictionary table using the first Unicode character. At step 62, the routine takes the first keyword object, identifies how many characters exist in that object, and then tests whether there are sufficient characters remaining in the problem description against which to make a comparison. If the outcome of the test at step 62 indicates that there are not sufficient many characters left in the problem description against which to make a comparison (given the x-many characters in the keyword object), the routine branches to step 64 because the search is complete with respect to the particular Unicode character. At step 64, the routine chops off the character that the routine did not match against and, at step 66, the routine continues searching by re-indexing into the top of the hash table at the next Unicode character in the problem description.

If, however, the outcome of the test at step 62 is positive, the routine continues at step 68 to compare the x-many characters in the keyword object against a corresponding number of characters in the problem description. A test is then done at step 70 to determine if there is a match with the keyword object that is a valid keyword. If the outcome of the test at step 70 does not indicate a match to a valid keyword, the routine continues at step 71 to test whether there are any more keyword objects in the list. If so, the routine branches to step 73 and gets the next ordered keyword object in the list (if any) and returns to step 68. If the outcome of the test at step 71 indicates there are no more keyword objects in the list, the routine is done processing.

If the outcome of the test at step 70 indicates a match to a valid keyword, the routine continues at step 72 by setting a pointer that identifies that the routine has (so far) found a keyword match. The match may be superseded if the keyword is a root of a larger keyword, as will be seen. The routine then continues at step 74 to make a temporary copy of the problem description by chopping off from the description the number of characters of the recently-matched keyword object. Because a match has been found, the routine then continues at step 76 to the list beneath that matched keyword. In other words, once a match to a keyword object has been found within a given level, the routine moves downward (if there are any remaining levels). Then, the routine then returns to step 68 to perform the compare process, beginning with the first keyword in the underlying list. As noted above, if there is no match, the routine moves to the next keyword object in the list. When there is a match to a valid keyword, the routine moves or updates the pointer. As matches are found, the routine chops off the number of characters from the problem description from the most-recently found keyword object and continues moving downward.

The matching routine then terminates (for the particular Unicode character entry point into the hash table) when the problem description has been matched up to a point and there is no keyword list below the object (which is a negative outcome of step 62), or when the routine moves through an entire level but does not find any match (which is a negative outcome of step 71). In either case, the routine then returns the then-current position of the pointer. Once the routine finishes the matching algorithm for a given pass, the routine cuts the keyword out of the problem description and continues with the next character (which may be a space or a new Unicode character). When the entire problem description has been analyzed in this fashion, the routine returns a list of the keywords. These keywords are then used as a reference to other problem solutions that have been previously tried or implemented.

Thus, according to the preferred matching algorithm, the routine begins searching the dictionary table using the Unicode value as the hash index. Once a keyword match is found, the routine continues to look for more specific keywords until another match is found, or it reaches the end of the list. If another match is found (and it completes a keyword), the routine moves the "matched node" pointer to this new keyword object and then continues searching below it for even more specific keywords. If the end of the list is reached, and a complete keyword was found, this keyword ID is returned and its solutions are eventually returned to the calling application. As noted above, before moving down a level, the routine also trims the matched keyword off of the description. This process enables additional keywords within the description to be recorded. Should the routine not find any matches, it moves to the second character in the description string and begins the process again. This process continues until the end of the problem description is reached.

Once all of the keywords are identified through the above process, as noted above, ADL identifies the appropriate solutions to return by looking in the keyword table 22. It then filters that solution for SCIM (if any was passed into the "match" algorithm) and for the security of the user requesting matches.

EXAMPLE

Figure 8:
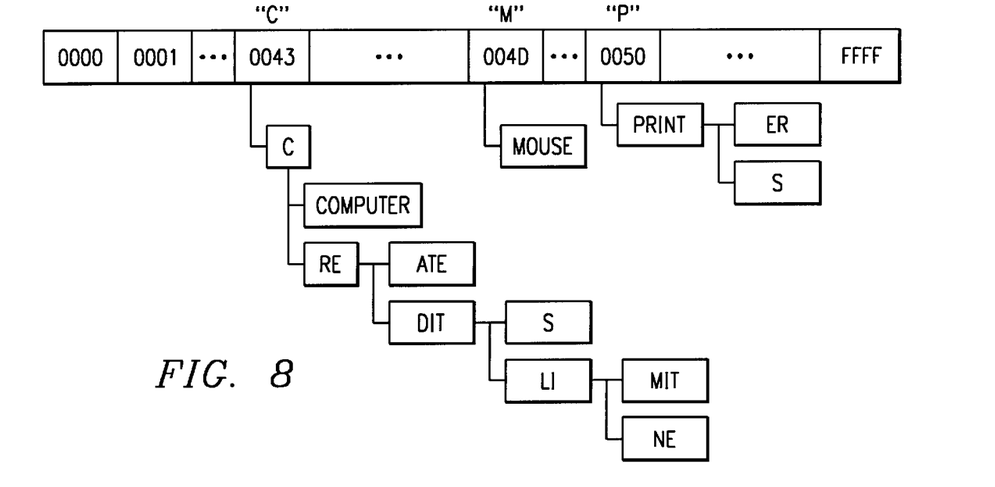
FIG. 8 is an illustration showing how the matching algorithm is executed against a particular problem description.

A problem is opened with the problem description "Computer misprints credit limit". FIG. 8 illustrates the existing keyword matrix 95. As can be readily ascertained, the matrix 95 includes the following keyword list:

| COMPUTER | CREDIT LINE | PRINTS |
| CREATE | CREDIT LIMIT | PRINTER |
| CREDIT | MOUSE | |
| CREDITS | PRINT | |

In addition to the character combination stored in each node of the keyword tree, as noted above, there is a keyword ID value that stores whether the letter combination completes an entire keyword term. In this example, "ATE" and "NE" complete terms, while "CRE" does not.

As has been previously described, the matching process begins with hashing the first character in the description, "C". This brings the routine to the list of keywords beginning with that character. The routine then compares each character combination in this top level to the problem description until one of the keywords is found to be a substring of the description or, alternatively, the top level of the tree is exhausted. If a stem was found, as it will be with "COMPUTER" in this example, the pattern matching routine checks to see if this point in the tree indicates a complete keyword or not. Because it does, this keyword is placed in the list of matches for this description. As noted above, the routine maintains a pointer to the current keyword in this match list.

Once a complete keyword has been added to the match list, the routine checks to see if there are any more specific keywords for the current match. "COMPUTER" is a leaf node, so there are none.

Finally, the routine moves the current position in the description forward to the first "unused" letter. In this case, the routine now points to the space between the words COMPUTER and MISPRINTS.

The next comparison begins with the space, for which there are no keywords in the hash table, so the routine continues. "M" is the next character in the description. "MOUSE" is compared with "MISPR", which fails. Because this is the only keyword in the top level under "M", there are no matches beginning with this letter. The current position pointer in the description is then moved to point to "I", then "S", finding no matches each time.

When "P" is reached, a match is found with "PRINT". The routine then checks and finds that this is a complete keyword, so the keyword is noted as a match and the current position in the description string is moved to the "S". Because "PRINT" is not a leaf node (i.e., has a list attached to it), comparison continues with the list of terms attached to "PRINT". The routine compares "ER" and finds no match. The routine then compares "S" with the remaining description and finds a match. "PRINTS" is noted as a match instead of "PRINT", and the routine skips ahead to the next position, which is a space. Because there are no more specific keywords beneath the "S" of "PRINTS" in the "P" hash container, this match is complete.

When "CRE" is matched with the rest of the description, the "CRE" is copied to a temporary pointer because it does not complete a keyword. The current position in the string is then moved to "D". A match with "DIT" is then found, and "CREDIT" is placed in the list of matches. Next, a "LI" is found, which is placed in the temporary location. When "MIT" matches the rest of the string, "LIMIT" is concatenated onto the end of the current match to make "CREDIT LIMIT".

According to the present invention, once the set of matching keywords are found, a set of solutions associated with at least one of the matching keywords is then generated by the solution identifying mechanism 23. The ranking mechanism 25 is then used to rank the set of solutions based on some given criteria. Thus, for example, the set of solutions may be ranked based on how many times the respective solutions have been used before, or how many matching keywords are associated with a respective solution, or both. Other ranking criteria may be implemented as well.

According to the invention, a score is associated with a list of possible solutions and represents a "relevance ranking" of each solution with respect to the problem description supplied. The higher the score, the more relevant the solution is to the problem being described. For each solution, preferably the routine tracks a list of keywords that have been used to describe the problem in the past. Associated with each keyword is the number of times the word has been used, namely the usage count. To provide a concrete example, if the word "COMPUTER" had been used in three different problem descriptions that were ultimately solved by a given solution, then the usage count for COMPUTER in that solution would be three.

Preferably, the total of the usage counts for keywords that appear in the current problem description, divided by the total number of usage counts for the solution itself, is then calculated. This function yields a weighted percentage of the terms used in the current description versus the terms used in the past to describe a problem that was solved by this solution. The "weighting" occurs because if a term is used heavily in the past, it will contribute more to the final percentage. For example, the following table represents the current "Learned Knowledge" for a given solution:

Solution:

| Term | Usage Count |
| --- | --- |
| COMPUTER | 6 |
| MONITOR | 1 |
| CABLE | 1 |
| HAMMER | 3 |

The following scores (actually partial scores) are based on different problem descriptions:
Score 1: Problem Description includes: COMPUTER, HAMMER
Score (partial)=(6+3)/(6+1+1+3)=9/11==0.82
Score 2: Problem Description includes: MONITOR, CABLE
Score (partial)=(1+1)/(6+1+1+3)=2/11=0.18
Note the partial score in the second example is much smaller than the first example even though both problems included two keyword matches. This is due to the "weighting" described above. The keywords COMPUTER and HAMMER were used six and three times, respectively, in the past to describe problems that were solved by the given solution, therefore they add more to the score when they are used again. Conversely, keywords MONITOR and CABLE were only used once each in the past so they contribute less to the score. If desired, the calculated values may be normalized for convenience.

One of ordinary skill will appreciate that the present invention provides numerous advantages. As an adaptive learning system, the inventive process facilitates an internationalized search and retrieval strategy that enables problem solutions to be quickly identified and ranked. Moreover, the matching algorithm provides an efficient and accurate technique for comparing non-tokenized text against a database of keywords. The matching algorithm, of course, has industrial applicability in any application where it is desired to match non-tokenized or tokenized text against a data structure organized as a set of keywords. Thus, the matching algorithm may be used for other applications such as file lookup, web searching and the like.

One of the preferred implementations of the invention is an application, namely, a set of instructions (program code) in a code module which may, for example, be resident in the random access memory of the computer. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

It should be appreciated by those skilled in the art that the specific embodiments disclosed above may be readily utilized as a basis for modifying or designing other techniques for carrying out the same purposes of the present invention. It should also be realized by those skilled in the art that such equivalent constructions do not depart from the spirit and scope of the invention as set forth in the appended claims.

What is claimed is:

1. A method for searching and retrieving solutions to user problems, comprising the steps of:
   matching keywords in a user problem to valid keywords using a parsed keyword data structure having a hash index based on a Unicode value; and responsive to identification of a set of matching keywords, determining a set of solutions associated with at least one of the matching keywords.

2. The method as described in claim 1 further including the step of ranking the set of solutions.

3. The method as described in claim 2 wherein the set of solutions are ranked based on a number of times a respective solution has been previously used.

4. The method as described in claim 2 wherein the set of solutions are ranked based on a number of matching keywords associated with a respective solution.

5. The method as described in claim 1 wherein the user problem comprises a non-tokenized text string.

6. The method as described in claim 1 wherein the user problem comprises a tokenized text string.

7. The method as described in claim 1 wherein the data structure is organized as a set of keyword objects.

8. The method as described in claim 7 wherein at least one keyword object is a root of a second keyword object.

9. An adaptive learning system for searching and retrieving solutions to user problems, comprising:

an internationalized search means for matching keywords in a user problem to valid keywords, the search means comprising a parsed keyword data structure with a hash index based on a Unicode value;

means responsive to the search means returning a set of matching keywords for determining a set of solutions associated with at least one of the matching keywords; and means for ranking the set of solutions.

10. The adaptive learning system as described in claim 9 wherein the user problem comprises a non-tokenized text string.

11. The adaptive learning system as described in claim 9 wherein the user problem comprises a tokenized text string.

12. The adaptive learning system as described in claim 9 wherein the means for ranking the set of solutions includes means for ranking solutions based on a number of times a respective solution has been previously used.

13. The adaptive learning system as described in claim 9 wherein the means for ranking the set of solutions includes means for ranking solutions based on a number of matching keywords associated with a respective solution.

14. A computer program in a computer readable medium for use on a computer for searching and retrieving a solution to a user problem described by a non-tokenized text string, comprising:

means for matching keywords in the non-tokenized text string to valid keywords using a parsed keyword data structure having a hash index based on a Unicode value; and means responsive to identification of a set of matching keywords for determining a set of solutions associated with at least one of the matching keywords.

15. The computer program as described in claim 14 further including:

means for ranking the set of solutions.

16. The computer program as described in claim 15 wherein the set of solutions are ranked based on a number of times a respective solution has been previously used.

17. The computer program as described in claim 15 wherein the set of solutions are ranked based on a number of matching keywords associated with a respective solution.

18. The computer program as described in claim 14 wherein the data structure is organized as a set of keyword objects.

19. The computer program as described in claim 14 wherein at least one keyword object is a root of a second keyword object.

* * * * *